April 26, 1932.  E. G. McDONALD  1,855,407
BRAKE
Filed June 28, 1928   3 Sheets-Sheet 1

INVENTOR
EUGENE G. McDONALD
BY
*m. W. McConkey*
ATTORNEY

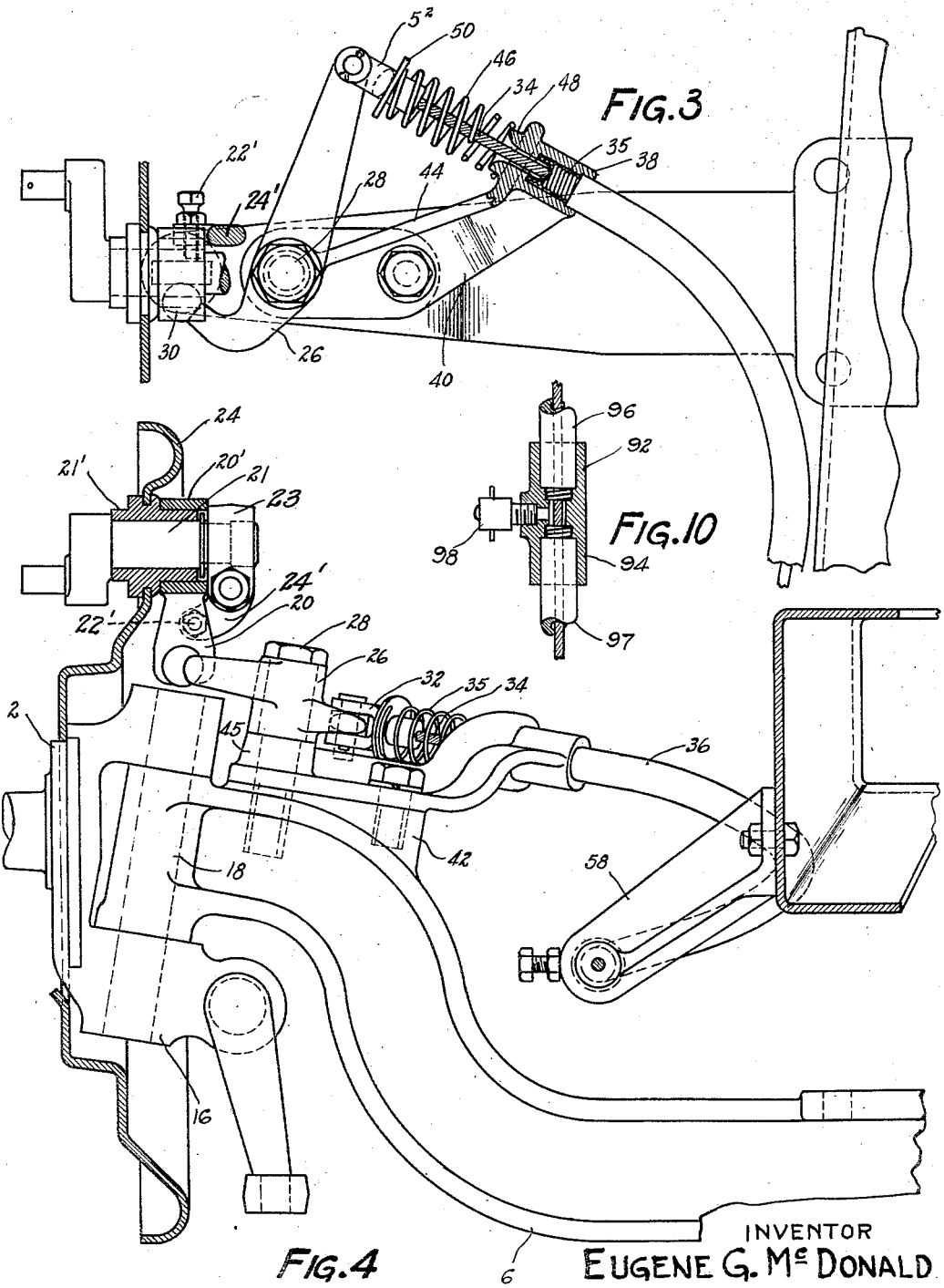

April 26, 1932. E. G. McDONALD 1,855,407
BRAKE
Filed June 28, 1928 3 Sheets-Sheet 3
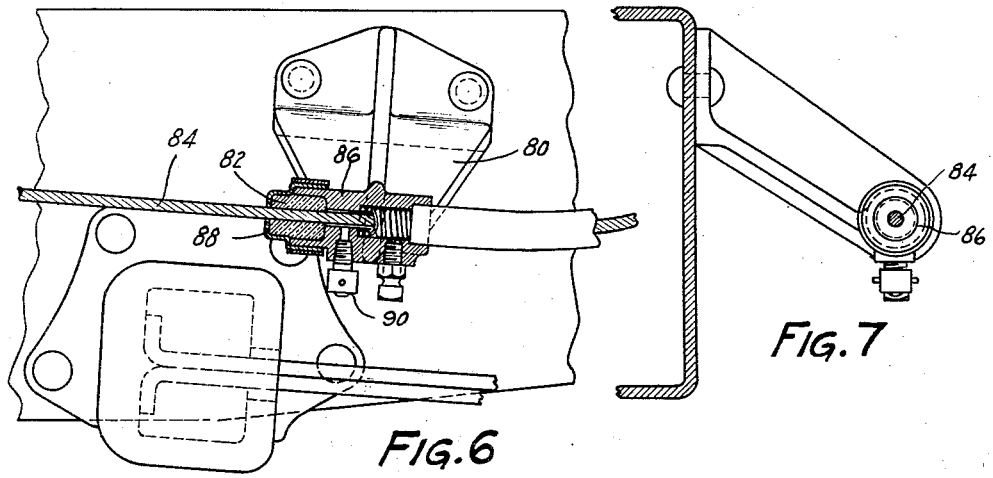
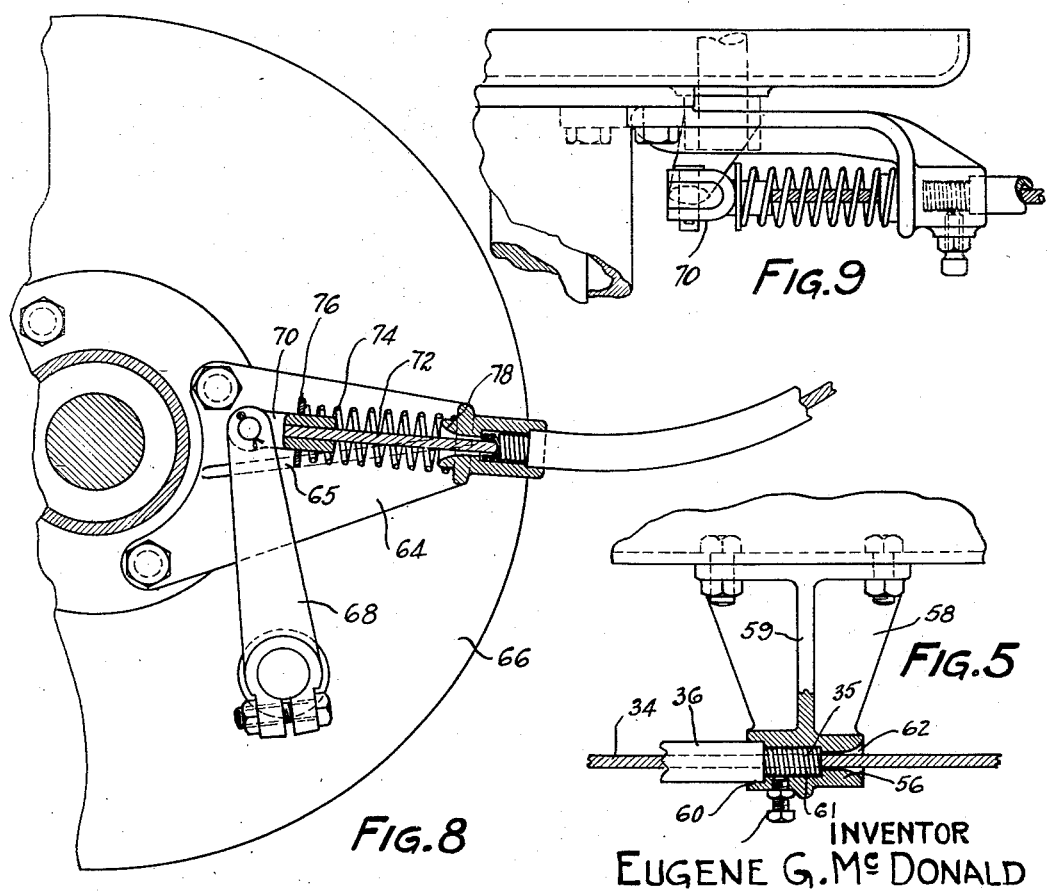
INVENTOR
EUGENE G. McDONALD
BY
M. W. McConkey
ATTORNEY Patented Apr. 26, 1932

1,855,407

UNITED STATES PATENT OFFICE

EUGENE G. McDONALD, OF SOUTH BEND, INDIANA, ASSIGNOR TO BENDIX BRAKE COMPANY, OF SOUTH BEND, INDIANA, A CORPORATION OF ILLINOIS

BRAKE

Application filed June 28, 1928. Serial No. 289,009.

This invention relates to operating mechanism for brakes, and is illustrated as embodied in a four wheel braking system for an automobile. An object of the invention is to provide a control means for the front brake in two principal parts, one of which compensates for the swiveling of the wheel and the other of which compensates for the action of the vehicle springs.

The invention, illustrated as applied to the steering wheels, preferably includes a control mounted on the axle and shown as being of the "crank-and-lever" type, that is, one including two levers, one swiveling with the wheel, and the other fulcrumed independently of the wheel,—together with novel operating means for the levers or their equivalents which compensates for the spring action and which is preferably in the form of a "Bowden" control including a tension element such as a steel cable passing through a flexible casing of fixed length.

When such a cable is carried directly to the brake, and must compensate for the swiveling of the wheel, it is difficult to make it heavy enough to take the forces applied to some brakes without interfering with the necessary flexibility. By my invention since the Bowden control does not compensate for the swiveling, the cable may be much less flexible and therefore much heavier.

Other features of novelty relate to the provision of novel inexpensive and effective supporting structures for the control mechanism disclosed. Such structure may, as illustrated, be embodied in novel brackets attached to the chassis frame, and to the front axle and rear wheel backing plate all serving to support the "Bowden" control structure.

Further objects and features relating to economics and details of construction and operation will definitely appear from the detailed description to follow, and in one instance I accomplish the object of my invention by the devices and means described in the following specification. A structure constituting a preferred embodiment of my invention is illustrated in the accompanying drawings forming a part of this specification, in which:

Figure 3 is a plan view of the novel steering wheel brake operating lever and flexible control connection therewith together with associated chassis parts;

Figure 4 is an elevation of the lever and control mechanism illustrated in Figure 3 together with associated parts and illustrating in perspective the bracket support for the flexible control structure;

Figure 5 is a plan view of the bracket referred to, and its associated flexible control structure, parts being in section;

Figure 6 is a partial elevation of the chassis frame indicating in elevation the rear bracket support and associated flexible control, parts being in section;

Figure 7 is a section taken on the line 7—7 of Figure 6 showing, in side elevation, the bracket and its associated parts connected with the flexible control;

Figure 8 is a partial side elevation of a rear wheel backing plate with control support bracket attached thereto, parts of lever and flexible control mechanism being shown;

Figure 9 is a plan view of the structure disclosed in Figure 8; and

Figure 10 is an enlarged view, partly in section, illustrating the novel flexible control lubricating and coupling structure indicated at 92 in Figure 2.

Figure 1:
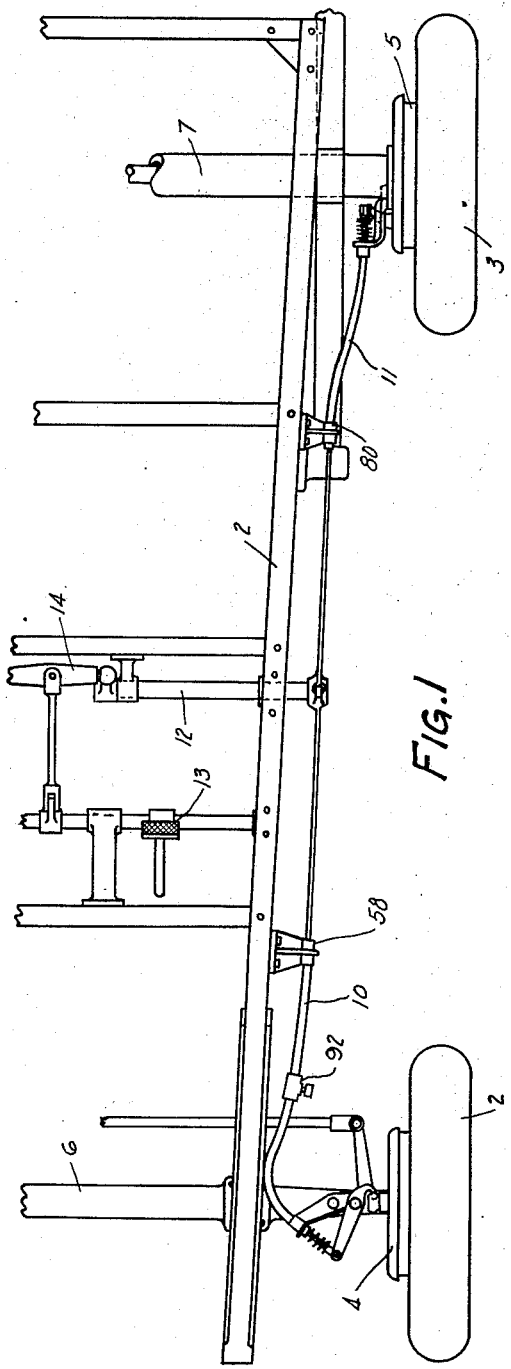
Figure 1 is a partial plan view of the automobile chassis, stripped to disclose the brake operating mechanism constituting the invention.
Figure 2:
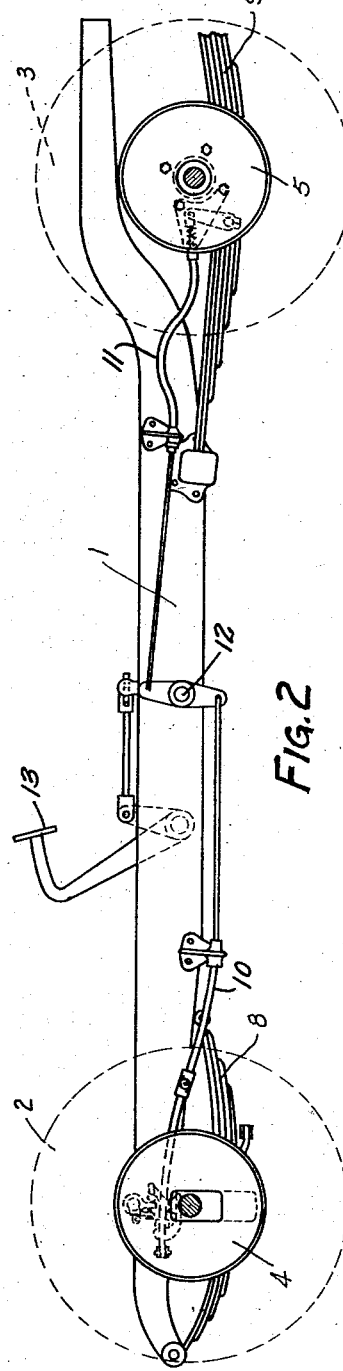
Figure 2 is a side elevation of the operating mechanism disclosed in Figure 1.

The structure selected for illustration includes, as shown in Figures 1 and 2, front and rear wheels 2 and 3 provided with brakes 4 and 5, said wheels having mounted thereon the vehicle chassis, generally indicated at 1. The chassis frame is shown supported on front and rear axles 6 and 7 by means of the usual springs 8 and 9. Bowden control cables 10 and 11, connected respectively to the aforementioned brakes are operatively connected to oppositely directed arms on the rock shaft 12 which is actuated in a conventional manner by a service pedal 13 and associated linkage, a suitable pressure equalizing structure 14 being introduced in the system.

Referring now to Figures 3 and 4 for a more detailed description of the front wheel control mechanism, 16 indicates the usual steering knuckle for the wheel 2 and pivotally connected, by means of the usual king pin 18, to the axle 6. Lever or crank arm 20, shown in the form of a narrow plate, extends from a suitable cam structure including a camshaft 21 journaled in a suitable bracket 21' carried by a backing plate 24 fixed to the knuckle. The arm 20, as indicated, may be integral with a sleeve 20' rotatably mounted on the bearing structure of bracket 21' and is adapted to abut against stop screw 22' adjustably mounted, as by a screw-threaded engagement, upon the arm 24' of a lever 23 adjustably clamped to the camshaft.

Lever 20 is actuated by a second or horizontal lever 26, shown as being fulcrumed between its ends upon axle 6 at 28, and having an integral ball 30 constituting the end of a substantially L-shaped part of the lever, which ball engages the plane face of lever or arm 20. The remaining portion of lever 26, extending for a substantial part of its length from the fulcrum, may be pivotally engaged at its end with bifurcated end 32 of a flexible control cable indicated generally by 10 in Figure 1.

The levers 20 and 26 are so arranged that when the brake is applied, the center of ball 30 is substantially in the swiveling axis, so that lever 20 rides around it when the wheel is swiveled without affecting the movement of the wheel. If it is desired to relieve the pressure on the brake when the wheel is on the outer side of a turn, the center of ball 30 is arranged when the brake is applied a few hundredths of an inch from the swiveling axis, on the side next the wheel.

It is also to be noted that in operation movement of crank 20 by lever 26 transmits through the stop 22' and lever 23, rotary movement to the camshaft, the crank 20 riding around the fixed bracket bearing.

The control as shown is of the "Bowden" type comprising an inner tension element such as a steel cable 34 surrounded by a housing such as a helical spring 35, the two housed in a suitable covering or tubing 36, all parts being flexible as shown. The ends of the cable parts are housed in openings of different diameter in the cylindrical end 38 of an angularly shaped bracket 40, supported on a boss 42, fixed to the axle 6, the bracket comprising a flat base plate preferably reinforced by rib 44 and boss 45, the latter supporting lever 26, said base preferably curved upwardly at one end to join the cylindrical portion 38.

A helical return spring 46 may be interposed between the flared ribbed end 48 of the bracket and a washer 50, or other stop, attached to the enlarged end 52 of the cable 34, the latter protruding from the bracket end 38. Set screw 54, suitably attached to the cylindrical end 38 functions to retain spring housing 35 in position.

According to a feature of my invention the inner end of the "Bowden" cable is housed, as disclosed in Figure 5, in the cylindrical end portion 56 of a bracket 58 the latter comprising an angular tapered plate suitably attached to the vehicle frame, reinforced by a central rib 59, the bracket extending outwardly and downwardly from the chassis frame. Outer casing 36 of the cable fits within an opening 60 in the bracket end and spring housing 35 is housed within a reduced portion 61 therein, the inner cable 34 passing through a still further reduced portion, the latter opening being flared outwardly at its end 62 to facilitate movement of the protruding cable 34.

A further feature of novelty relates to the rear wheel control support and is clearly disclosed in Figures 8 and 9, in which the "Bowden" cable 11 is housed at one of its ends in the cylindrical end portion of an angular shaped bracket 64 reinforced by a central rib 65 suitably attached to the backing plate 66. Brake operating lever 68 is actuated by a pivotally connected bifurcated end 70 of cable 72 surrounded by return spring 74 interposed between stop 76 and rib end 78 all as more particularly heretofore described, the front and rear brake structure being identical in this respect.

Referring now to Figure 6, indicating a further detail of my invention rear support bracket 80 may be provided with a rubber bushing 82 surrounding the cable 84 at one end of cylindrical portion 86 on said bracket, and is suitably retained by a clip or sleeve 88, this structure permitting play of the flexible cable at the bracket opening. In all other respects the rear bracket is identical with the front bracket 58 previously described. In order that the flexible cable may be properly lubricated the rear bracket 80 is provided with a suitable lubricating connection 90 which may be of any suitable type and, as shown in Figure 10, 92 indicates generally a connection preferably interposed in the front wheel flexible control comprising a coupling 94 housing ends 96 and 97 of the flexible control structure, a suitable lubricating connection 98 interposed between said ends.

In operation, movement of the service pedal by the operator effects, through the equalizing structure, and equal distribution of pressure to each side of the vehicle, that is, to each pair of brakes 4 and 5. Movement of the Bowden control mechanism effects an application of front and rear brakes through the medium of levers 20 and 26 against the action of return springs 46 and 74 which are tensioned in proportion to the degree of movement of the control cables. Upon discontinuing the service pedal pressure the tensioned return springs function to effectively disengage the brake shoes by forcing the levers 20 and 26 back to their inoperative positions. It is thus apparent that a simple, inexpensive and efficient brake actuating lever and control structure is provided constituted of few parts, the latter being both accessible for repair and easily replaced.

As heretofore pointed out the swiveling of the wheel so far as it affects the control structure is compensated for by the particular type of control mechanism employed which is mounted directly on the axle and is of the crank and lever type. This control structure permits the use of a heavy type of flexible control structure co-operating therewith, the latter being mounted on the chassis and because of its flexibility compensating for the vertical movement of the car body through the springs.

The conduit lubricators shown in Figures 1, 6, and 10 are described and claimed in my co-pending divisional application, Serial Number 589,740 filed January 29, 1932.

I am aware that the structure disclosed herein may be altered considerably without departing from the spirit of the invention and, therefore, it is not my intention to limit its scope to those particular embodiments disclosed and described or otherwise than by the terms of the appended claims.

I claim:

1. In an automotive vehicle including an axle and a wheel having a swiveling connection with said axle, said wheel provided with a brake, a lever pivoted to said axle adapted to actuate said brake and a flexible brake control means pivoted to said lever and arranged to actuate the same, said control comprising a flexible cable housed in part by a flexible covering.

2. A brake assembly comprising, in combination, a vehicle axle, a wheel mounted thereon having a swiveling movement therewith, retarding means for the wheel, a lever arranged to operate the retarding means, and a second lever engaging and actuating said first lever, said second lever pivoted to an unsprung portion of said vehicle, and flexible control means for said second-mentioned lever pivoted thereto and including means for returning said second lever to an inoperative position when the brake is released.

3. In a vehicle comprising an axle and a wheel mounted thereon, a brake assembly for said wheel comprising, in combination, a brake actuating lever fulcrumed on said axle, one arm of the same extending forwardly beyond the axle, and flexible control means pivoted to said forwardly extending arm, said flexible control means including means for returning said forwardly extending arm to an inoperative position when the brake is released.

4. In an automotive vehicle comprising an axle and a wheel mounted thereon for swiveling movement, said wheel provided with a brake, control means for said brake in two principal parts, both of which being supported by a single bracket member secured to said axle.

5. In an automotive vehicle comprising an axle and a wheel mounted thereon for swiveling movement, said wheel provided with a brake, control means for said brake comprising, in combination, a lever fulcrumed on a bracket member supported on said axle, said lever provided with an arm extending across and beyond the outline of said axle forwardly of the vehicle, and a supplemental flexible control means pivoted to said extended lever end, said latter means also supported by said bracket and further extending when in released position, in a sweeping curve from said bracket toward the rear end of said vehicle.

6. Operating means for a brake mounted on a swiveled vehicle wheel, said wheel mounted on a vehicle including springs comprising, in combination, means unaffected by the swiveling of the wheel and flexible means attached to the vehicle and co-operating with said first-mentioned means, said flexible means compensating for the vehicle spring movement and comprising a tension element adapted to return said first-mentioned means to an inoperative position when the brake is released.

7. A bracket structure adapted to be mounted on the front axle of an automotive vehicle comprising a flat base portion provided at one end thereof with a substantially cylindrical boss and further provided with a reinforcing flange extending along one edge thereof.

8. A bracket structure comprising a tapered flat body portion reinforced by a central rib, said body provided at one end with a supporting flange and at the other end with a substantially cylindrically shaped boss portion.

In testimony whereof, I have hereunto signed my name.

EUGENE G. McDONALD.